US012554421B2

(12) United States Patent
Ding et al.

(10) Patent No.: US 12,554,421 B2
(45) Date of Patent: Feb. 17, 2026

(54) POWER STABILIZATION FOR MEMORY SYSTEMS

(71) Applicant: Micron Technology, Inc., Boise, ID (US)

(72) Inventors: Junxian Ding, Boise, ID (US); Yang Lu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/480,380

(22) Filed: Oct. 3, 2023

(65) Prior Publication Data

US 2024/0143201 A1  May 2, 2024

Related U.S. Application Data

(60) Provisional application No. 63/381,988, filed on Nov. 2, 2022.

(51) Int. Cl.
*G06F 3/06* (2006.01)

(52) U.S. Cl.
CPC .......... *G06F 3/0625* (2013.01); *G06F 3/0634* (2013.01); *G06F 3/0673* (2013.01)

(58) Field of Classification Search
CPC .... G06F 3/0625; G06F 3/0634; G06F 3/0673; G06F 1/3225; G06F 1/3275; G06F 3/0604; G06F 3/0653; G11C 16/30; G11C 5/14
USPC .................................................. 711/154, 100
See application file for complete search history.

(56) References Cited

U.S. PATENT DOCUMENTS

| | | | |
|---|---|---|---|
| 2007/0011421 A1* | 1/2007 | Keller, Jr. .............. | G06F 1/3275 713/320 |
| 2007/0067651 A1* | 3/2007 | May .......................... | G06F 1/26 713/300 |
| 2019/0340142 A1* | 11/2019 | Patel ........................ | G06F 13/24 |
| 2020/0209944 A1* | 7/2020 | Palmer ................... | G06F 9/3836 |

\* cited by examiner

*Primary Examiner* — Hosain T Alam
*Assistant Examiner* — Zubair Ahmed
(74) *Attorney, Agent, or Firm* — Holland & Hart LLP

(57) ABSTRACT

Methods, systems, and devices for power stabilization for memory systems are described. A memory system may be implemented with a power source that is configured to adjust one or more aspects of its regulation based on an indication associated with a power consumption for one or more operations to be performed by the memory system. For example, a memory system may include a controller configured to determine the power consumption for performing upcoming operations (e.g., based on the quantity of operations and the type of operations), and transmit an indication associated with the power consumption to the power source (e.g., as a proactive or feed-forward control indication). The power source may adjust its regulation based on the indication from the controller, which may include adjusting gains, circuitry, or other regulation configurations or characteristics associated with providing the power for performing the upcoming operations (e.g., at a regulated voltage).

18 Claims, 11 Drawing Sheets

POWER STABILIZATION FOR MEMORY SYSTEMS

CROSS REFERENCE

The present Application for Patent claims the benefit of U.S. Provisional Patent Application No. 63/381,988 by DING et al., entitled "POWER STABILIZATION FOR MEMORY SYSTEMS," filed Nov. 2, 2022, which is assigned to the assignee hereof, and which is expressly incorporated by reference in its entirety herein.

FIELD OF TECHNOLOGY

The following relates to one or more systems for memory, including power stabilization for memory systems.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
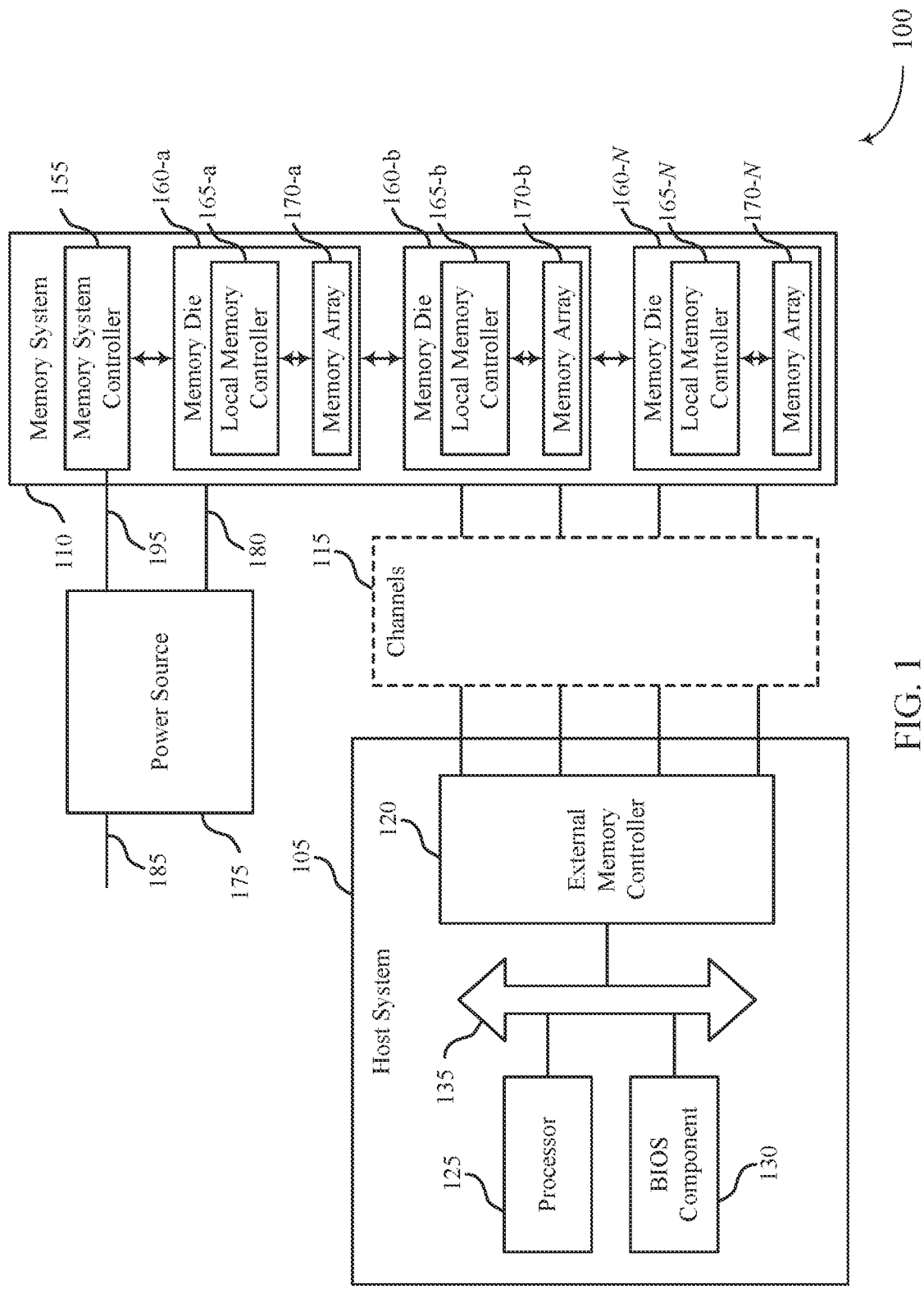
FIG. 1 illustrates an example of a system that supports power stabilization for memory systems in accordance with examples as disclosed herein.

Some memory systems may be associated with (e.g., include, be coupled with) a power source (e.g., a power management integrated circuit (PMIC)) that is configured to provide power to one or more components of the memory system (e.g., one or more memory dies, one or more controllers) for performing operations of the memory system. In some examples, a power source may be configured to provide power in the form of electrical current via an output of the power source (e.g., an output terminal, an output rail), and the power source may be configured to regulate a voltage at the output to support stable operating characteristics of the components coupled with the output. In some cases, however, a power source may be unable to fully adjust to relatively fast or high-magnitude changes in power consumption, which may be related to relatively fast or substantial changes in activity level of the memory system. For example, voltage regulation of a power source may be unable to maintain a target voltage, or maintain an output voltage within a target voltage range (e.g., within a range of a target voltage), in response to relatively fast or large changes in current consumption, which may result in voltage overshoot or undershoot at the output of the power source. In some examples, voltage overshoot or undershoot may adversely affect the operations of one or more components of a memory system coupled with the power source, which may cause degraded performance or failures of the memory system.

In accordance with examples as disclosed herein, a memory system may be implemented with a power source that is configured to adjust one or more aspects of its regulation based on an indication associated with a power consumption for one or more operations to be performed by the memory system (e.g., an indication of an anticipated power consumption, an indication of a predicted power consumption). For example, a memory system may include a controller (e.g., a memory system controller) configured to determine the power consumption for performing upcoming operations (e.g., access operations commanded by a host system, refresh operations determined by the controller) based on the quantity of operations and the type of operations, and to transmit an indication associated with the power consumption (e.g., a classification of the power consumption, a value associated with the power consumption) to the power source (e.g., as a proactive or feed-forward control indication). The power source may adjust its regulation based on the indication from the controller, which may include adjusting gains, circuitry, or other regulation configurations or characteristics associated with providing the power for performing the upcoming operations (e.g., at a regulated voltage). In some examples, providing the indication to the power source may support adapting responsiveness to changes in the level of activity of the memory system (e.g., decreasing the likelihood of voltage undershoot or overshoot). In such examples, the memory system may benefit from accurate, balanced, and efficient power regulation, thereby preventing degraded performance or failures of the memory system.

Figure 2:
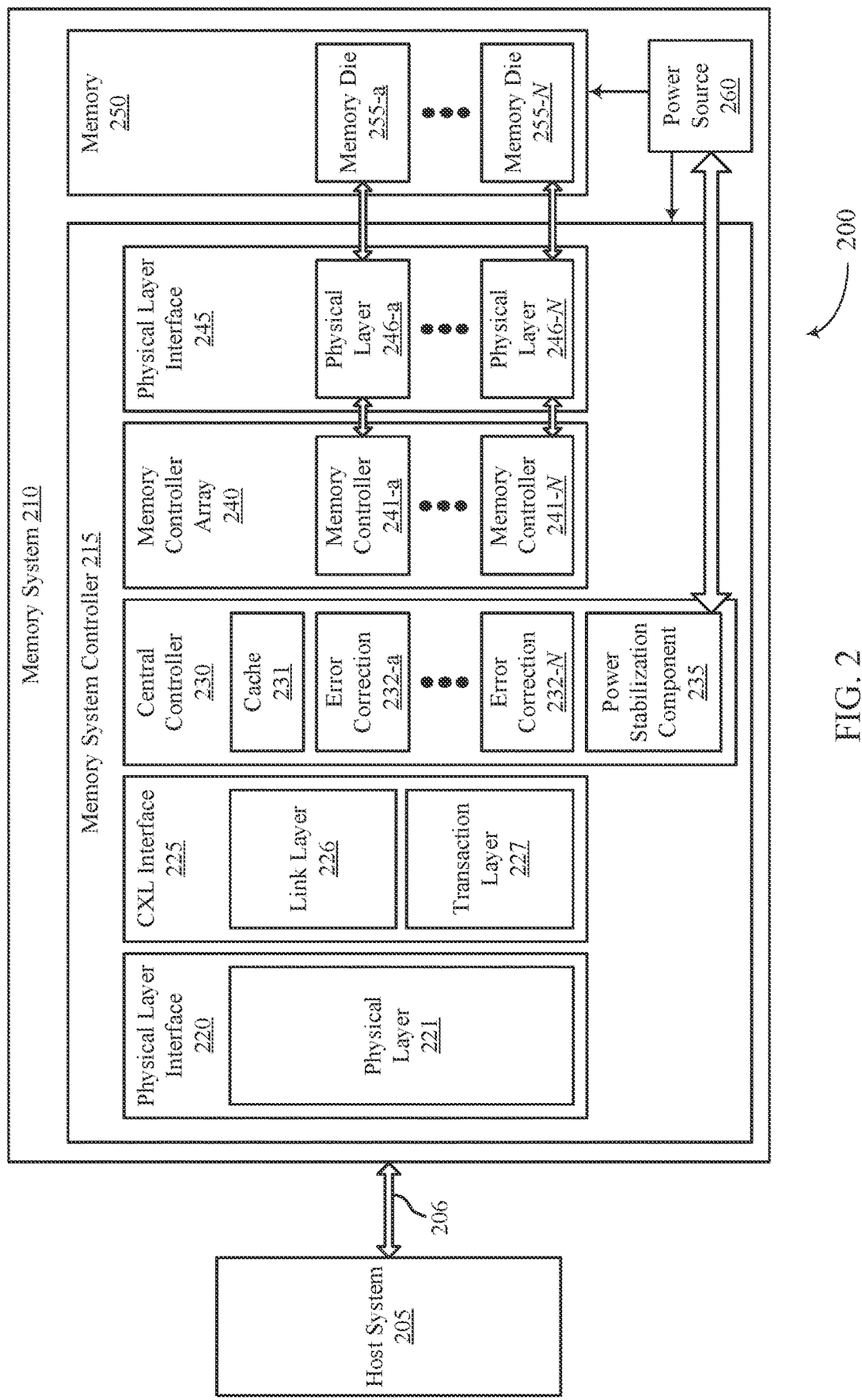
FIG. 2 illustrates an example of a system that supports power stabilization for memory systems in accordance with examples as disclosed herein.

Features of the disclosure are initially described in the context of systems with reference to FIGS. 1 and 2. Features of the disclosure are described in the context of components, current and voltage diagrams, and process flow as described with reference to FIGS. 3 through 5. These and other features of the disclosure are further illustrated by and described with reference to apparatus diagrams and flowcharts that relate to power stabilization for memory systems as described with reference to FIGS. 6 through 11.

FIG. 1 illustrates an example of a system 100 that supports power stabilization for memory systems in accordance with examples as disclosed herein. The system 100 may include a host system 105, a memory system 110, and one or more channels 115 coupling the host system 105 with the memory system 110. The system 100 may include one or more memory systems 110, but aspects of the one or more memory systems 110 may be described in the context of a single memory system (e.g., memory system 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory system 110 may be a component of the system 100 that is operable to store data for one or more other components of the system 100.

Portions of the system 100 may be examples of the host system 105. The host system 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host system 105 may refer to the hardware, firmware, software, or any combination thereof that implements the functions of an external memory controller 120. In some examples, the external memory controller 120 may be referred to as a host (e.g., host system 105) or a host interface.

A memory system 110 may be an independent device or a component that is operable to provide physical memory addresses/space that may be used or referenced by the system 100. In some examples, a memory system 110 may be configurable to work with one or more different types of host systems. Signaling between the host system 105 and the memory system 110 may be operable to support one or more of: modulation schemes to modulate the signals, various pin configurations for communicating the signals, various form factors for physical packaging of the host system 105 and the memory system 110, clock signaling and synchronization between the host system 105 and the memory system 110, timing conventions, or other functions.

The memory system 110 may be operable to store data for the components of the host system 105. In some examples, the memory system 110 (e.g., operating as a secondary-type system to the host system 105, operating as a dependent-type system to the host system 105) may respond to and execute commands provided by the host system 105 through the external memory controller 120. Such commands may include one or more of a write command for a write operation, a read command for a read operation, a refresh command for a refresh operation, or other commands.

The host system 105 may include one or more of an external memory controller 120, a processor 125, a basic input/output system (BIOS) component 130, or other components such as one or more peripheral components or one or more input/output controllers. The components of the host system 105 may be coupled with one another using a bus 135.

The processor 125 may be operable to provide functionality (e.g., control functionality) for the system 100 or the host system 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host system 105. The BIOS component 130 may also manage data flow between the processor 125 and the various components of the system 100 or the host system 105. The BIOS component 130 may include instructions (e.g., a program, software) stored in one or more of read-only memory (ROM), flash memory, or other non-volatile memory.

In some examples, the memory system 110 may communicate information (e.g., data, commands, or both) with the host system 105. For example, the memory system 110 may receive a write command indicating that the memory system 110 is to store data received from the host system 105, or receive a read command indicating that the memory system 110 is to provide data stored in a memory die 160 to the host system 105, among other types of information communication.

The memory system 110 may include a memory system controller 155 and one or more memory dies 160 (e.g., memory chips) to support a capacity (e.g., a desired capacity, a specified capacity) for data storage. A memory system 110 including two or more memory dies 160 may be referred to as a multi-die memory or a multi-die package or a multi-chip memory or a multi-chip package. Each memory die 160 (e.g., memory die 160-$a$, memory die 160-$b$, memory die 160-N) may include a local memory controller 165 (e.g., local memory controller 165-$a$, local memory controller 165-$b$, local memory controller 165-N) and a memory array 170 (e.g., memory array 170-$a$, memory array 170-$b$, memory array 170-N). A memory array 170 may be a collection (e.g., one or more grids, one or more banks, one or more tiles, one or more sections) of memory cells, with each memory cell being operable to store one or more bits of data. In some examples, a memory cell of a memory array 170 may store a charge representative of the programmable states in a capacitor. DRAM architectures may include a capacitor that includes a dielectric material to store a charge representative of the programmable state. In other memory architectures, other storage devices and components are possible.

The memory system controller 155 may include components (e.g., circuitry, logic) operable to control operation of the memory system 110. The memory system controller 155 may include hardware, firmware, or instructions that enable the memory system 110 to perform various operations and may be operable to receive, transmit, or execute commands, data, or control information related to the components of the memory system 110. The memory system controller 155 may be operable to communicate with one or more of the external memory controller 120, the one or more memory dies 160, or the processor 125. In some examples, the memory system controller 155 may control operation of the memory system 110 described herein in conjunction with the local memory controller 165 of the memory die 160.

A local memory controller 165 (e.g., local to a memory die 160) may include components (e.g., circuitry, logic) operable to control operation of the memory die 160. For example, a local memory controller 165 may control the accessing of a memory array 170 through the various components (e.g., decoders, sense components). A local memory controller 165 may be operable to receive one or more of commands or data from one or more different memory controllers (e.g., an external memory controller 120, a memory system controller 155, another controller associated with the memory die 160), translate the commands or the data (or both) into information that can be used by the memory die 160, perform one or more operations on the memory die 160, and communicate data from the memory die 160 to a host system 105 based on performing the one or more operations. A local memory controller 165 may be operable to perform one or more access operations on memory cells of a memory array 170. Examples of access operations may include a write operation, a read operation, a refresh operation, a precharge operation, or an activate operation, among others. In some examples, access operations may be performed by or otherwise coordinated by a local memory controller 165 in response to various access commands (e.g., from a host system 105). A local memory controller 165 may be operable to perform other access operations not listed here or other operations related to the operating of the memory die 160 that are not directly related to accessing the memory cells.

In some examples, a local memory controller 165 may be operable to communicate (e.g., receive or transmit data or commands or both) with the memory system controller 155. In some examples, a memory system 110 may not include a memory system controller 155, and a local memory controller 165 or the external memory controller 120 may perform various functions described herein. As such, a local memory controller 165 may be operable to communicate with the memory system controller 155, with other local memory controllers 165, or directly with the external memory controller 120, or the processor 125, or any combination thereof. Examples of components that may be included in the memory system controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the memory system controller 155 or local memory controller 165 or both.

The external memory controller 120 may be operable to enable communication of information (e.g., data, commands, or both) between components of the system 100 (e.g., between components of the host system 105, such as the processor 125, and the memory system 110). The external memory controller 120 may process (e.g., convert, translate) communications exchanged between the components of the host system 105 and the memory system 110. In some examples, the external memory controller 120 may be or may include an interface configured for communications with the memory system 110 (e.g., over one or more channels 115), which may be configured in accordance with a memory protocol or other design standard (e.g., as a Compute Express Link (CXL) interface or other interface). In some examples, the external memory controller 120, or other component of the system 100 or the host system 105, or its functions described herein, may be implemented by the processor 125. For example, the external memory controller 120 may be hardware, firmware, or software, or some combination thereof implemented by the processor 125 or other component of the system 100 or the host system 105. Although the external memory controller 120 is depicted as being external to the memory system 110, in some examples, the external memory controller 120, or its functions described herein, may be implemented by one or more components of a memory system 110 (e.g., a memory system controller 155, a local memory controller 165) or vice versa.

The components of the host system 105 may exchange information with the memory system 110 using one or more channels 115. The channels 115 may be operable to support communications between the external memory controller 120 and the memory system 110. Each channel 115 may be an example of a transmission medium that carries information between the host system 105 and the memory system 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host system 105 and a second terminal at the memory system 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address channels, one or more clock signal channels, one or more data channels, among other types of channels, or combinations thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal). In some examples, one or more channels 115 may be referred to as CXL channels.

The system 100 may include a power source 175 (e.g., a power management integrated circuit (PMIC)) that is configured to provide power to one or more components of the memory system 110 (e.g., one or more memory dies 160, the memory system controller 155) for performing operations of the memory system 110. Although shown outside the illustrative boundary of the memory system 110 (e.g., a location that may be on a motherboard or other component of the system 100), in some examples, the power source may be included in the memory system 110 (e.g., in a memory system module) or otherwise considered to be a part of the memory system 110. In some examples, the power source 175 may be configured to provide power to the memory system 110 in the form of an electrical current via a power supply bus 180 (e.g., a power supply rail) that is coupled with an output of the power source, and which may be coupled (e.g., directly, indirectly) with the memory system controller 155, with one or more memory dies 160, or a combination thereof. The power supply bus 180 may include one or more conductive paths, which may support providing power in accordance with one or more output voltages. The power source 175 may receive power via a power input line 185, which may be coupled with the host system 105 (e.g., a voltage regulator of the host system 105, via one or more channels 115), with a battery, or with a power generation source (e.g., an electrical utility, a power converter), and which may supply power to the power source 175 via a direct current (DC) waveform, an alternating current (AC) waveform, or another electrical waveform. The power source 175 may be configured to regulate a voltage of one or more conductors of the power supply bus 180 (e.g., as a DC output, using power received over the power input line 185), which may support stable operating characteristics of the components coupled with the power supply bus 180 (e.g., the memory system controller 155, the memory dies 160).

In accordance with examples as disclosed herein, a power source 175 may be configured to adjust one or more aspects of its regulation based on an indication associated with a power consumption for one or more operations to be performed by the memory system 110 (e.g., an indication of an anticipated power consumption, an indication of a predicted power consumption). For example, the memory system controller 155 may be configured to determine the power consumption for performing upcoming operations (e.g., access operations commanded by the host system 105, refresh operations or other operations that may be determined by the memory system controller 155) based on the quantity of operations and the type of operations. The memory system controller 155 may transmit an indication associated with the power consumption (e.g., a classification of the power consumption, a value associated with the power consumption) to the power source 175 (e.g., as a proactive or feed-forward control indication) over a signaling bus 195, which may be a unidirectional or bidirectional bus that supports control signaling between the memory system controller 155 and the power source 175. The power source 175 may adjust its regulation based on the indication from the memory system controller 155, which may include adjusting gains, circuitry (e.g., drivers, filtering circuitry), or other regulation configurations or characteristics associated with providing the power for performing the upcoming operations (e.g., at one or more regulated voltages of the power supply bus 180). In some examples, providing the indication to the power source 175 may support adapting responsiveness to changes in the level of activity of the memory system 110 (e.g., decreasing the likelihood of voltage undershoot or overshoot). In such examples, the memory system 110 may benefit from accurate, balanced, and efficient power regulation, thereby preventing degraded performance or failures of the memory system 110.

FIG. 2 illustrates an example of a system 200 that supports power stabilization for memory systems in accordance with examples as disclosed herein. The system 200 may be an example of and implement aspects of a system 100, as described with reference to FIG. 1. For example, the system 200 may include a host system 205 and a memory system 210, which may be examples of a host system 105 and a memory system 110, as described with reference to FIG. 1. The memory system 210 may include a memory system controller 215, which may be an example of a memory system controller 155. The memory system controller 215, among other portions of the memory system 210, may be configured for communicative coupling with or between the host system 205 (e.g., via one or more channels 206, which may be an example of channels 115) and memory 250 which may include one or more memory dies 255 (e.g., memory dies 160, dynamic random access memory (DRAM) dies, among other types of memory dies, memory dies 255-a through 255-N). For example, the memory system controller 215 may be configured to manage aspects of access operations on memory dies 255, which may be commanded by the host system 205, or which may be otherwise determined at the memory system controller 215 (e.g., without a command from the host system 205).

The memory system controller 215 may be an example of a CXL controller, and may include a physical layer interface 220, a CXL interface 225, a central controller 230, a memory controller array 240, or a physical layer interface 245, among other constituent components or combinations thereof. Each of the components of a memory system controller 215 may refer to a portion of hardware, firmware, software (e.g., stored in a non-transitory computer readable medium of the memory system controller 215), or any combination thereof that is configured to support a functionality of the memory system controller 215.

The physical layer interface 220 may be configured to support operations of a physical layer 221 (e.g., a peripheral component interconnect express (PCIe) layer, a CXL PHY layer, a flex bus physical layer, a communications protocol layer), which may support communication of information between the memory system 210 (e.g., the memory system controller 215) and the host system 205. The CXL interface 225 may be configured to support operations of a link layer 226 and a transaction layer 227, in which case the link layer 226 may support transmitting information between the physical layer 221 and the transaction layer 227, and the transaction layer 227 may support determining the information type and the information formatting, among other functions. The central controller 230 may include a cache 231 (e.g., a cache memory), one or more error correction components 232 (e.g., error correction components 232-a through 232-N) that support detecting and correcting data errors, and a power stabilization component 235 (e.g., a proactive power stabilization block), among other components. The memory controller array 240 may include a set of one or more memory controllers 241 (e.g., memory controllers 241-a through 241-N), which each may be associated with a respective memory die 255 and which each may control aspects of access operations on the respective memory die 255. The physical layer interface 245 may include one or more physical layer components 246 (e.g., physical layer components 246-a through 246-N), which may support communication of information between the memory system controller 215 (e.g., the memory controllers 241) and the memory 250 (e.g., the memory dies 255, which may include each physical layer component 246 being configured in accordance with a type or configuration of the respective memory die 255).

The system 200 may include a power source 260 (e.g., a PMIC), which may be an example of a power source 175. Although illustrated as a component of the memory system 210, in some other implementations, the power source 260 may be external to the memory system 210 (e.g., as a separately-packaged component) and may be coupled with the memory system 210 (e.g., coupled with one or more components of the memory system 210, such as the memory 250, or the memory system controller 215, or both). The power source 260 may be configured to provide power for the memory system 210 to perform various operations. For example, the power source 260 may be configured to provide power in the form of electrical current via one or more outputs of the power source 260 (e.g., a power supply bus 180), and the power source 260 may be configured to regulate a voltage at a respective output (e.g., as a voltage regulator) to support stable operating characteristics of the components of the memory system 210 that are coupled with the output. For example, the power source 260 may provide power to the memory dies 255 via one or more output rails for performing operations (e.g., access operations, refresh operations) of the memory dies 255. In various implementations, an output (e.g., an output rail) may provide power via a regulated voltage to multiple memory dies 255, or a set of multiple outputs (e.g., multiple output rails) may each provide power via a respective regulated voltage to a respective memory die 255 of the memory 250. Additionally, or alternatively, the power source 260 may be configured to provide power via a regulated voltage to the memory system controller 215 for performing operations of the memory system controller 215. In some examples, different outputs of the power source 260 may be regulated to different target voltages. For example, the power source 260 may regulate a first set of one or more outputs at a first target voltage to support operations of the DRAM dies 255, and may regulate a second set of one or more outputs at a second target voltage (e.g., different than the first target voltage) to support operations of the memory system controller 215, among other examples of supporting multiple regulated voltages.

The power source 260 may be configured to receive an indication of power consumption (e.g., an indication of an anticipated power consumption, an indication of a predicted power consumption) from the memory system controller 215. For example, the memory system controller 215 (e.g., the central controller 230) may include a power stabilization component 235, which may be configured to determine a power consumption associated with performing operations of the memory system 210 (e.g., access operations performed on the memory dies 255, operations of the memory system controller 215). The power stabilization component 235 may be configured to transmit an indication of the power consumption to the power source 260, and the power source 260 may be configured to adjust its regulation based on the received indication. Thus, the power source 260 may provide power for the operations of the memory system 210 in accordance with a predicted power consumption indicated by the memory system controller 215. Providing the indication to the power source 260 may enable the power source 260 to adjust its regulation, supporting accurate, balanced, and efficient power regulation, among other advantages.

Figure 3:
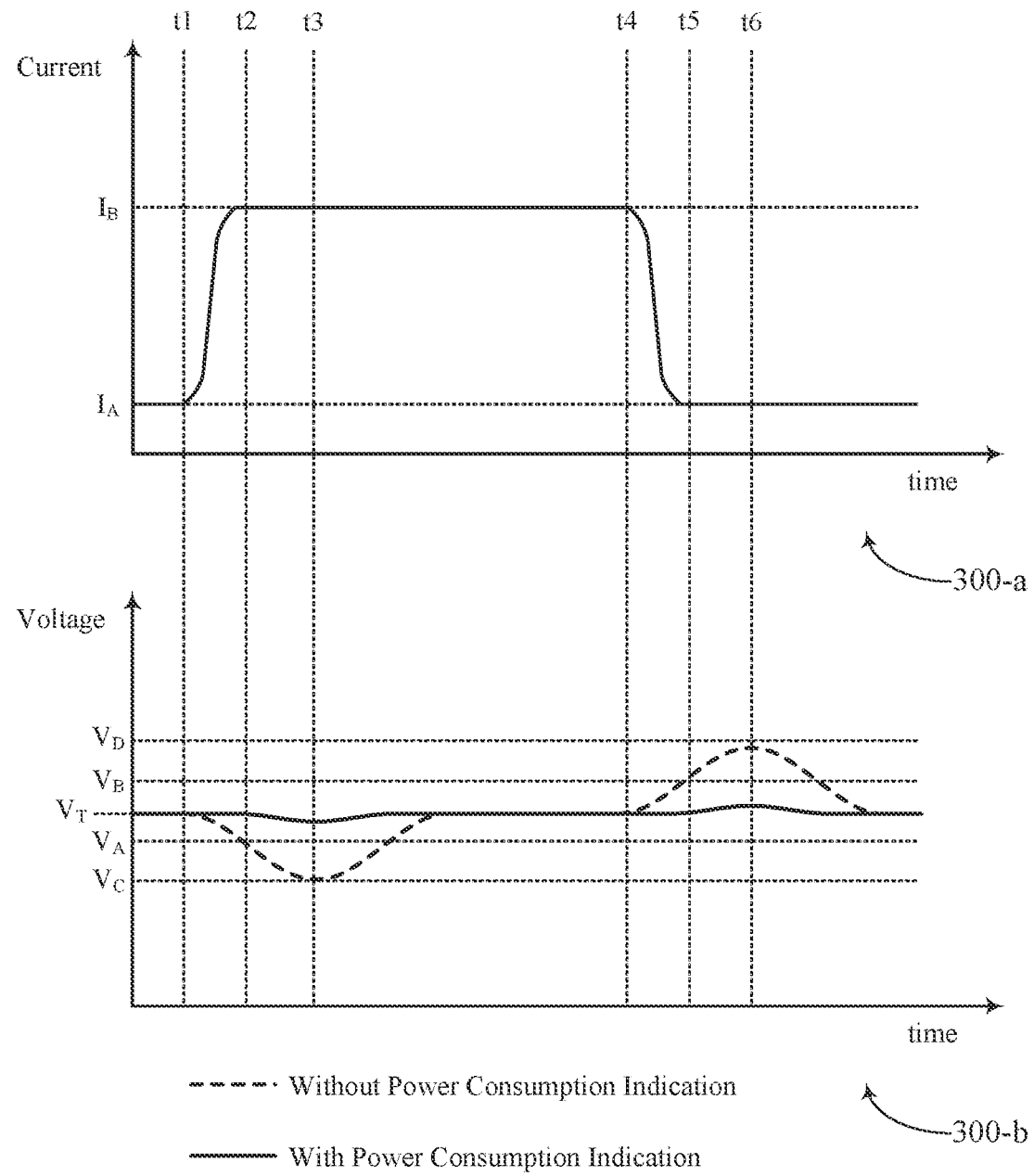
FIG. 3 illustrates a current diagram and a voltage diagram that support power stabilization for memory systems in accordance with examples as disclosed herein.

FIG. 3 illustrates a current diagram 300-$a$ and a voltage diagram 300-$b$ that support power stabilization for memory systems in accordance with examples as disclosed herein. The current diagram 300-$a$ and the voltage diagram 300-$b$ may illustrate operations of a power source 175 and a memory system 110 (e.g., via a power supply bus 180). For example, the current diagram 300-$a$ may illustrate an example of current consumption of the memory system 110 over time (e.g., as provided by a power source 175), and the voltage diagram 300-$b$ may illustrate examples of voltage output by the power source 175 or received at the memory system 110 over a power supply bus 180 during the current consumption.

In some implementations, the power source 175 may be configured to regulate an output (e.g., of a power supply bus 180) to a target voltage (e.g., $V_T$) but, in some examples, the power source 175 may lack an adequate capability to adjust to some changes in power consumption that are relatively fast, or are relatively large in magnitude, which may be related to relatively fast or relatively large changes in activity level of a memory system 110. For example, as illustrated by the example of a voltage response of the voltage diagram 300-$b$ without a power consumption indication, regulation of a power source 175 may be unable to maintain an output voltage of a power supply bus 180 within a threshold of the target voltage in response to relatively fast changes or relatively large changes in current consumption.

In some examples, a relatively fast or a relatively large increase to current drawn from the power source 175 may exceed a regulation capability of the power source 175, which may result in a voltage undershoot (e.g., a voltage of a power supply bus 180 exceeding a threshold amount below the target voltage). For example, prior to t1, an activity level of the memory system 110 may be relatively low (e.g., performing relatively few access operations on memory dies 160, performing relatively few operations of a memory system controller 155), such that the current consumption of the memory system is relatively low (e.g., $I_A$), and such that the power source 175 is capable of maintaining the output at or near the target voltage $V_T$. At t1, the activity level of the memory system 110 may begin increasing to a relatively high level, such that the current consumption of the memory system increases to a relatively high level (e.g., $I_B$). In response to the increased activity level, the voltage output by the power source 175 may begin to drop, and the dropping voltage may trigger a responsive regulation by the power source 175 to return the output towards the target voltage.

In some examples, however (e.g., without a power consumption indication), the power source 175 may be unable to adequately respond. For example, at t2, the output voltage may drop below $V_A$, which may represent a lower threshold for proper operations of the memory system 110, or may represent a voltage threshold at which the power source 175 initiates a regulation. In some examples, for at least some duration (e.g., after t2), operations of the memory system 110 may be degraded or experience failures due to the voltage being relatively far below $V_T$ (e.g., beyond a threshold below $V_T$). In some examples, at t3 (e.g., a time of a peak undershoot, associated with a voltage $V_C$), the power source 175 may begin to compensate for the voltage undershoot, but such a regulation implementation may be unable to prevent adverse behavior of the memory system 110 associated with the relatively large voltage undershoot. In some examples, such adverse behavior may be related to a delay due to a voltage change detection (e.g., a duration between t1 and t2), or a delay in regulation by the power source 175 (e.g., a duration between t2 and t3) or a combination thereof.

Additionally. or alternatively, in some examples, a relatively fast or a relatively large decrease to current drawn from the power source 175 may exceed a regulation capability of the power source 175, which may result in a voltage overshoot (e.g., a voltage of a power supply bus 180 exceeding a threshold amount above the target voltage). For example, prior to t4, an activity level of the memory system 110 may be relatively high, such that the current consumption of the memory system is relatively high (e.g., $I_B$), and such that the power source 175 is capable of maintaining the output at or near the target voltage $V_T$. At t4, the activity level of the memory system 110 may begin decreasing to a relatively low level, such that the current consumption of the memory system decreases to a relatively low level (e.g., $I_A$). In response to the decreased activity level, the voltage output by the power source 175 may begin to rise, and the rising voltage may trigger a responsive regulation by the power source 175 to return the output towards the target voltage.

In some examples, however (e.g., without a power consumption indication), the power source 175 may be unable to adequately respond. For example, at t5, the output voltage may rise above $V_B$, which may represent an upper threshold for proper operations of the memory system 110, or may represent a voltage threshold at which the power source 175 initiates a regulation. In some examples, for at least some duration (e.g., after t5), operations of the memory system 110 may be degraded or experience failures due to the voltage being relatively far above $V_T$ (e.g., beyond a threshold above $V_T$). In some examples, at t6 (e.g., a time of a peak overshoot, associated with a voltage $V_D$), the power source 175 may begin to compensate for the voltage overshoot, but such a regulation implementation may be unable to prevent adverse behavior of the memory system 110 associated with the relatively large voltage overshoot.

Figure 4:
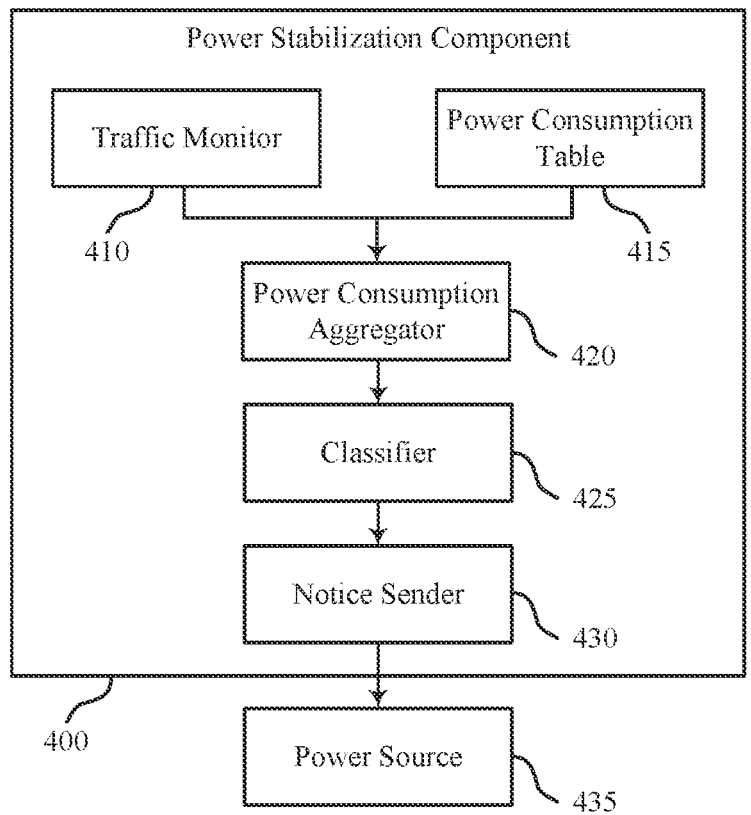
FIG. 4 illustrates an example of a power stabilization component that supports power stabilization for memory systems in accordance with examples as disclosed herein.
Figure 4:
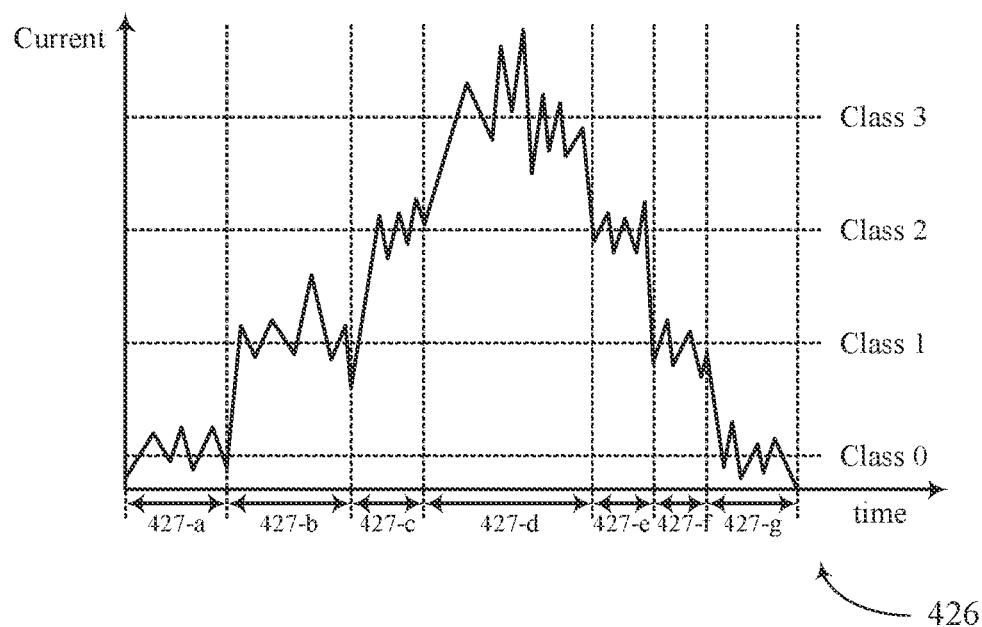

In accordance with examples as disclosed herein, a power source 175 may be configured to adjust one or more aspects of its regulation based on a proactive indication associated with a power consumption for one or more operations to be performed by a memory system 110. For example, regarding an increase in activity level (e.g., associated with the time t1), a memory system controller 155 may be configured to transmit an indication associated with the change from a current $I_A$ to a current $I_B$ (e.g., before the increased activity level, as a proactive or feed-forward control indication, as a change in current load, as a rate of change of current load, as a magnitude of current load) and, in response, the power source 175 may adjust its regulation to better accommodate the upcoming increase in activity level. Additionally. or alternatively, regarding a decrease in activity level (e.g., associated with the time t4), a memory system controller 155 may be configured to transmit an indication associated with the change from a current Is to a current $I_A$ (e.g., before the decreased activity level) and, in response, the power source 175 may adjust its regulation to better accommodate the upcoming decrease in activity level. Thus, as illustrated by the example of a voltage response of the voltage diagram 300-b with a power consumption indication, regulation of a power source 175 may be able to maintain the output voltage of a power supply bus 180 within a threshold of the target voltage (e.g., within a range of $V_A$ to $V_B$) in response to the changes in current consumption FIG. 4 illustrates an example of a power stabilization component 400 that supports power stabilization for memory systems in accordance with examples as disclosed herein. The power stabilization component 400 may be an example of aspects of a power stabilization component 235 (e.g., as a component of a memory system controller 215). The power stabilization component 400 may be configured to identify a level of activity of a memory system 110 and transmit an indication of a power consumption to a power source 435, which may be an example of a power source 175. The power stabilization component 400 may include a traffic monitor 410, a power consumption table 415, a power consumption aggregator 420, a classifier 425, and a notice sender 430, each of which may refer to hardware, firmware, software, or any combination thereof that implements functions of the power stabilization component 400.

The traffic monitor 410 may be configured to identify operations to be performed by the memory system 110 (e.g., based on one or more received indications of operations to be performed by the memory system 110), which may involve identifying a respective quantity of one or more types of operations. For example, the traffic monitor 410 may be configured to identify a quantity of access operations (e.g., on one or more memory dies 160), which may have been commanded by a host system 105 or initiated by the memory system 110, or a quantity of operations of a memory system controller 155, among other examples.

The power consumption table 415 may be configured store a respective power consumption value (e.g., an expected power consumption, an expected current consumption) associated with performing each type of operation of the memory system 110. For example, the power consumption table 415 may store power consumption values for performing access operations (e.g., a respective power consumption value for a read operation, for a write operation, for a refresh operation), power consumption values for performing data management operations, and power consumption values for performing operations of the memory system controller 155 (e.g., a power consumption value for each operation of the memory system controller).

The power consumption aggregator 420 may be configured to generate an aggregate power consumption value based on inputs from the traffic monitor 410 and the power consumption table 415. For example, the power consumption aggregator 420 may determine an aggregate power consumption value by identifying power consumption values (e.g., using the power consumption table 415) for each of the types of operations identified by the traffic monitor 410, multiplying the power consumption values for each type of operation by the identified quantity of operations of that type, and summing the results.

The classifier 425 may be configured to compare aggregate power consumption values to predefined ranges (e.g., classes, current classes) to classify the aggregate power consumption values. For example, the classifier 425 may receive aggregate power consumption values from the power consumption aggregator 420 and assign the aggregate power consumption value to one of a set of multiple ranges of power consumption. In some implementations, an aggregate power consumption value may be assigned to a class based on satisfying a threshold (e.g., a current threshold) associated with the class, which may involve a degree of hysteresis to avoid dithering. The diagram 426 illustrates an example of a classification of aggregate power consumption values (e.g., expressed as an aggregate current over time) by the classifier 425. For example, for a duration 427-a, aggregate power consumption values may be classified as a class 0, for a duration 427-b, aggregate power consumption values may be classified as a class 1, for a duration 427-c, aggregate power consumption values may be classified as a class 2, and for duration 427-d, aggregate power consumption values may be classified as a class 3, and so on for durations 427-e, 427-f, and 427-g.

The notice sender 430 may transmit an indication associated with the classified power consumption to the power source 435, such as an indication of a class of the power consumption as determined by the classifier 425. In some cases, each class may be associated with a two-bit value that is signaled to the power source 435. For example, class 0 may be associated with a first value (e.g., 00), class 1 may be associated with a second value (e.g., 01), class 2 may be associated with a third value (e.g., 10), and class 3 may be associated with a fourth value (e.g., 11). In some examples, such a classification and indication using relatively few bits may be associated with relatively low signaling overhead. However, in some other examples, the notice sender 430 may implement a different degree of granularity, or a different signaling technique, depending on design criteria of a given system. In various implementations, the notice sender 430 may transmit the indication of power consumption based on determining a change in the class, based on determining that a change in the aggregate of power consumption value satisfies a threshold, or based on a clock signal (e.g., at regular intervals), among other signaling criteria.

The power source 435 may accordingly supply power to a memory system 110 based on the indication of power consumption received from the notice sender 430. In some examples, the power source 435 may supply power in accordance with the class indicated by the notice sender 430. For example, after receiving a class 1 indication (e.g., 01), the power source 435 may adjust its regulation (e.g., voltage regulation) to support a current consumption associated with the class 1 indication, which may improve an ability of the power source to maintain an output voltage relatively close to a target voltage compared to techniques that lack an indication of impending power consumption.

Figure 5:
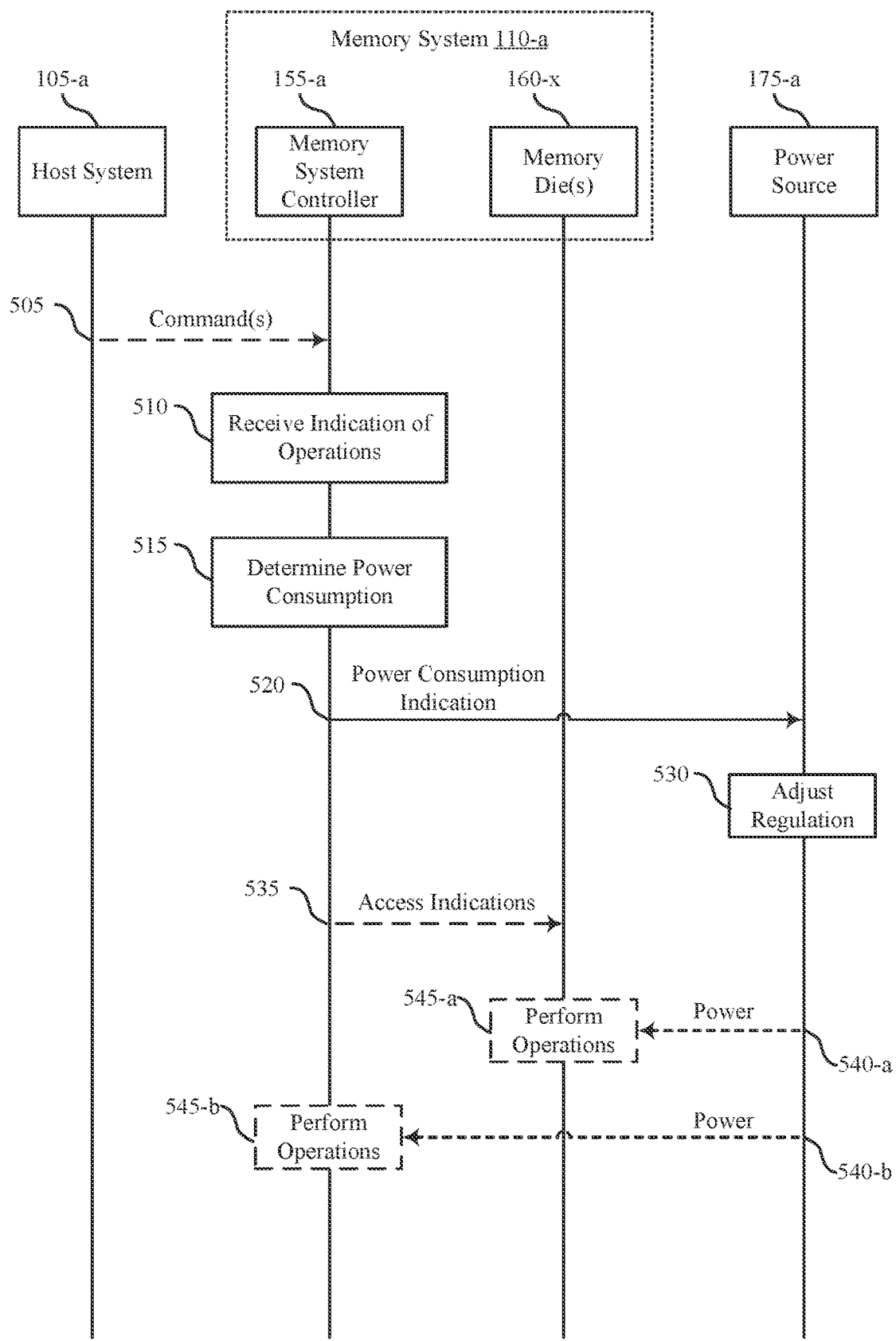
FIG. 5 illustrates an example of a process flow that supports power stabilization for memory systems in accordance with examples as disclosed herein.

FIG. 5 illustrates an example of a process flow 500 that supports power stabilization for memory systems in accordance with examples as disclosed herein. The process flow 500 may illustrate aspects or operations of systems 100 or 200. For example, the process flow 500 may depict operations involving a host system 105-a, a memory system 110-a (e.g., including at least a memory system controller 155-a and memory die(s) 160-x, and which may be coupled with the host system 105-a via one or more channels 115) and a power source 175-a (e.g., coupled with the memory system 110-a, included in the memory system 110-a). In some examples, operations of the process flow 500 may be performed in different orders or at different times. Further, at least some operations may be omitted from the process flow 500, or other operations may be added to the process flow 500.

At 510, the memory system controller 510 may receive one or more indications of operations to be performed by the memory system 110-a. In some examples, an indication of operations received at 510 may include or be otherwise associated with one or more commands from the host system 105-a (e.g., as received by the memory system controller 155-a from the host system 105-a at 505), which may include access commands, memory management commands, or other types of indications of operations to be performed by the memory system 110-a. Additionally, or alternatively, an indication of operations at 510 may not be associated with an indication from the host system 105-a (e.g., may be received from within the memory system 110-a, may be associated with operations determined to be performed by a component of the memory system controller 155-a), such as an indication of refresh or other memory management operations determined by the memory system controller 155-a, among other examples. The operations to be performed by the memory system 110-a may refer to operations performed at the memory die(s) 160-x, or operations performed at the memory system controller 155-a, or a combination thereof.

At 515, the memory system controller 155-a may determine a power consumption associated with the operations to be performed by the memory system 110-a. In some cases, the memory system controller 155-a may identify a respective quantity of operations associated with each operation type (e.g., of one or more types of operations to be performed), and determine the power consumption (e.g., as an aggregate power consumption value) based on the respective quantities and a power consumption associated with the respective operation types (e.g., as a sum of multiplications). In some cases, determining the power consumption may include determining a current associated with performing the one or more operations in accordance with an output voltage that is regulated by the power source 175-a.

At 520, the memory system controller 155-a may transmit an indication associated with the power consumption for the operations to be performed by the memory system 110-a (e.g., as determined at 515), which may be received by the power source 175-a. In some examples, the indication of 520 may indicate a classification of the power consumption, which may have been determined based on comparing the determined power consumption to one or more thresholds (e.g., associated with ranges of power consumption). In some examples, the indication of 520 may include an indication of a current, or a range of current, estimated to be provided from the power source 175-a to support the operations to be performed by the memory system 110-a. In some examples, the indication of 520 may be transmitted based on the memory system controller 155-a determining that a change in the power consumption satisfies a threshold (e.g., a change in power consumption class), or determining that a magnitude of power consumption satisfies a threshold, among other criteria for performing the transmission of 520.

At 530, the power source 175-a may adjust its regulation based on receiving power consumption indication of 520. For example, the power source 515 may adjust its regulation to provide a current to the memory system 110-a at a regulated voltage based on the indicated power consumption for performing the one or more operations. In some cases, the power source 515 may adjust its regulation based on comparing the power consumption to the power consumption thresholds at 550. In some cases, the power source 515 may adjust its regulation based on determining that the indicated power consumption satisfies a threshold change of power consumption.

In some examples, the adjustment of 530 may include the power source 175-a adjusting a regulation of one or more output voltages of the power source (e.g., a regulation associated with one or more voltage levels of one or more conductors of a power supply bus 180). In some examples, the adjustment of 530 may include the power source 175-a changing one or more controller gains of the power source 175-a. In some examples, the adjustment of 530 may include the power source 175-a changing a rate of power regulation by the power source, such as a clock rate, a controller rate, a duration of a controller cycle, a sample rate, or a timestep of a controller of the power source 175-a. In some examples, the adjustment of 530 may include the power source 175-a enabling or disabling power regulation circuitry of the power source. For example, the power source 175-a may enable a relatively higher quantity of output drivers in response to an indication of a relatively higher power consumption, or a relatively lower quantity of output drivers in response to an indication of a relatively lower power consumption. Additionally, or alternatively, the power source 175-*a* may enable different quantities of or portions of controller or filtering circuitry associated with regulating an output of the power source 175-*a*.

In some examples, such adjustments may involve changes that increase an power consumption or decrease an efficiency of the power source 175 itself and, after accommodating an acceleration of activity level, or after accommodating an increase in activity level, the power source 175-*a* may return to a configuration with a lower power consumption or higher efficiency. For example, enabling a higher quantity of drivers or increasing a rate of control may involve a greater amount of power consumption within the power source 175-*a*, which may be appropriate for supporting a relatively fast change in activity or a relatively high level of activity of the memory system 110-*a*. However, in response to a decrease in activity level, the power source 175-*a* may enable a lower quantity of drivers or decrease a rate of control, which may support a lower amount of power consumption within the power source 175-*a*, thereby supporting more-efficient operation when the memory system 110-*a* is not expected to operate with a high activity level or a relatively rapid acceleration of activity level. Thus, in accordance with these and other examples, providing an indication of an upcoming power consumption to the power source 175-*a* may support adapting responsiveness to changes in the level of activity of the memory system 110-*a* (e.g., decreasing the likelihood of or degree of voltage undershoot or overshoot), such that a system may benefit from accurate, balanced, and efficient power regulation.

At 540, the power source 175-*a* may provide power for the memory system 110-*a* to perform the one or more operations based at least in part on the regulation of the power source 175-*a* as adjusted at 530. For example, at 540-*a*, the power source 175-*a* may provide power to the memory die(s) 160-*x* to perform at least a subset of the operations and, at 545-*a*, the memory die(s) 160-*x* may perform the at least a subset of the operations. In some examples, the operations of 545-*a* may be performed at the memory die(s) 160-*x* in response to an indication from the memory system controller 155-*a* (e.g., an access indication or other indication, such as an indication to perform one or more access operations, which may be based on commands of 505 or based on access operations determined at the memory system controller 155-*a* without an indication from the host system 105-*a*), which may be transmitted by the memory system controller 155-*a* at 535 (e.g., after or before transmitting the indication of 520, depending on timing for adapting power consumption or latency for performing operations). Additionally, or alternatively, at 540-*b*, the power source 175-*a* may provide power to the memory system controller 155-*a* to perform at least a subset of the operations, and, at 545-*b*, the memory system controller 155-*a* may perform the at least a subset of the operations, which may be performed concurrently with or at a different time than the operations of 545-*a*. In some examples, the power of 540-*a* and the power of 540-*b* may be provided in accordance with the same regulated voltage (e.g., a same voltage target). In some examples, the power of 540-*a* and the power of 540-*b* may be provided in accordance with different regulated voltage (e.g., different voltage targets, via different conductors of a power supply bus 180, such as providing power of 540-*a* in accordance with a voltage target of 1.8V and providing the power of 540-*b* in accordance with a voltage target of 1.2V). By transmitting the power consumption indication of 520, the power source 175-*a* may be configured to be more responsive to the power consumption associated with the operations of 545, such that the operations of 545 may be performed in accordance with a voltage that is relatively closer to a target voltage, which may improve the ability of the memory system 110-*a* to perform the operations.

Figure 6:
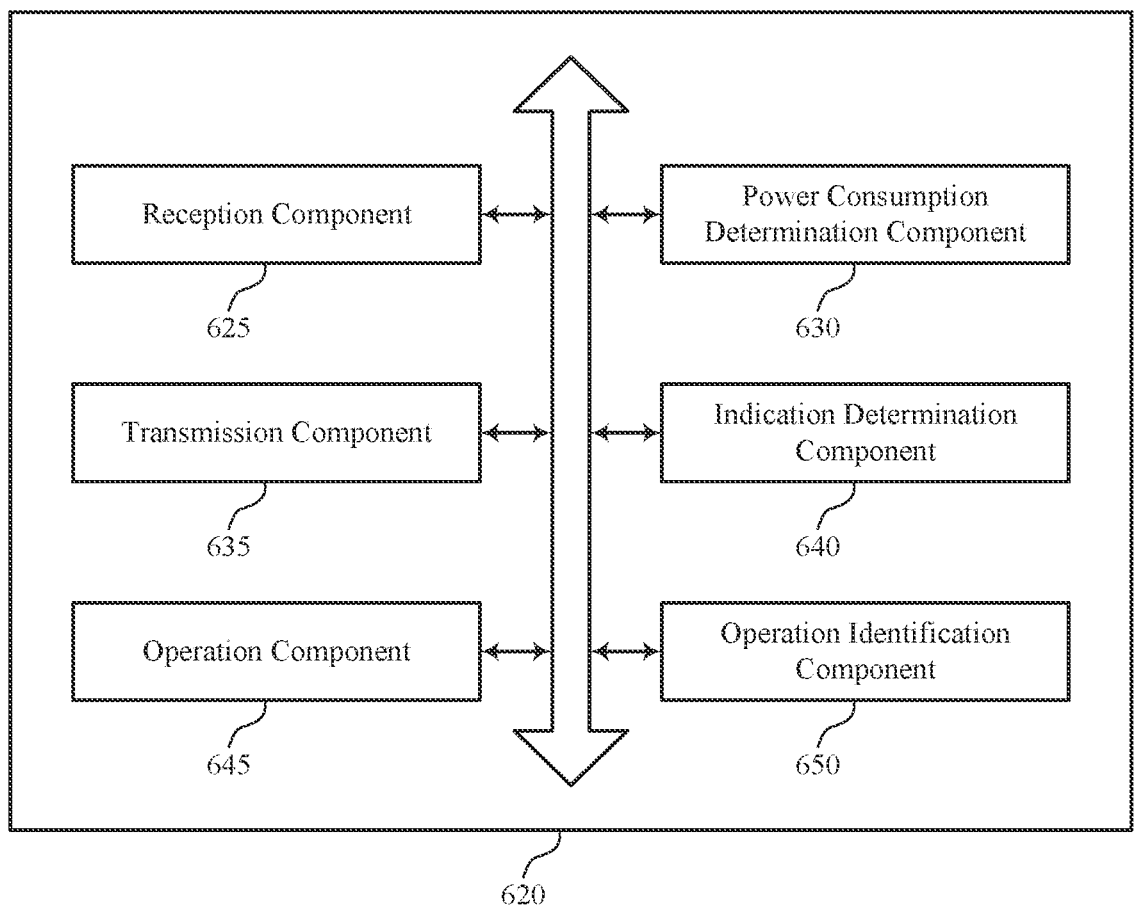
FIG. 6 shows a block diagram of a memory system controller that supports power stabilization for memory systems in accordance with examples as disclosed herein.

FIG. 6 shows a block diagram 600 of a memory system controller 620 that supports power stabilization for memory systems in accordance with examples as disclosed herein. The memory system controller 620 may be an example of aspects of a memory system controller as described with reference to FIGS. 1 through 5. The memory system controller 620, or various components thereof, may be an example of means for performing various aspects of power stabilization for memory systems as described herein. For example, the memory system controller 620 may include a reception component 625, a power consumption determination component 630, a transmission component 635, an indication determination component 640, an operation component 645, an operation identification component 650, or any combination thereof. Each of these components may communicate, directly or indirectly, with one another (e.g., via one or more buses).

The reception component 625 may be configured as or otherwise support a means for receiving, at a controller of a memory system, a first indication of one or more operations to be performed by the memory system. The power consumption determination component 630 may be configured as or otherwise support a means for determining, by the controller of a memory system, a power consumption associated with one or more operations to be performed by the memory system. The transmission component 635 may be configured as or otherwise support a means for transmitting, by the controller of the memory system, a second indication associated with the determined power consumption to a power source that is configured to provide power for the one or more operations to be performed by the memory system.

In some examples, to support receiving the first indication of the one or more operations to be performed by the memory system, the reception component 625 may be configured as or otherwise support a means for receiving, from a host system coupled with the controller of the memory system, one or more indications of at least a subset of the one or more operations to be performed by the memory system.

In some examples, to support receiving the first indication of the one or more operations to be performed by the memory system, the reception component 625 may be configured as or otherwise support a means for receiving an indication of one or more operations determined to be performed by the memory system without an associated indication from a host system coupled with the controller of the memory system.

In some examples, the indication determination component 640 may be configured as or otherwise support a means for determining the second indication based at least in part on comparing the determined power consumption to one or more power consumption thresholds.

In some examples, the power consumption determination component 630 may be configured as or otherwise support a means for determining that the power consumption satisfies a threshold change of power consumption. In some examples, the transmission component 635 may be configured as or otherwise support a means for transmitting the second indication based at least in part on determining that the power consumption satisfies the threshold change of power consumption.

In some examples, the transmission component 635 may be configured as or otherwise support a means for transmitting, by the controller of the memory system, one or more third indications to one or more memory dies coupled with the power source to perform at least a subset of the one or more operations.

In some examples, the operation component 645 may be configured as or otherwise support a means for performing, by the controller of the memory system, at least a subset of the one or more operations after transmitting the second indication.

In some examples, the operation identification component 650 may be configured as or otherwise support a means for identifying a quantity of operations, of the one or more operations to be performed by the memory system, associated with an operation type. In some examples, the power consumption determination component 630 may be configured as or otherwise support a means for determining the power consumption based at least in part on the identified quantity of operations associated with the operation type and a power consumption associated with the operation type.

In some examples, to support determining the power consumption, the power consumption determination component 630 may be configured as or otherwise support a means for determining a current associated with performing the one or more operations in accordance with an output voltage that is regulated by the power source.

Figure 7:
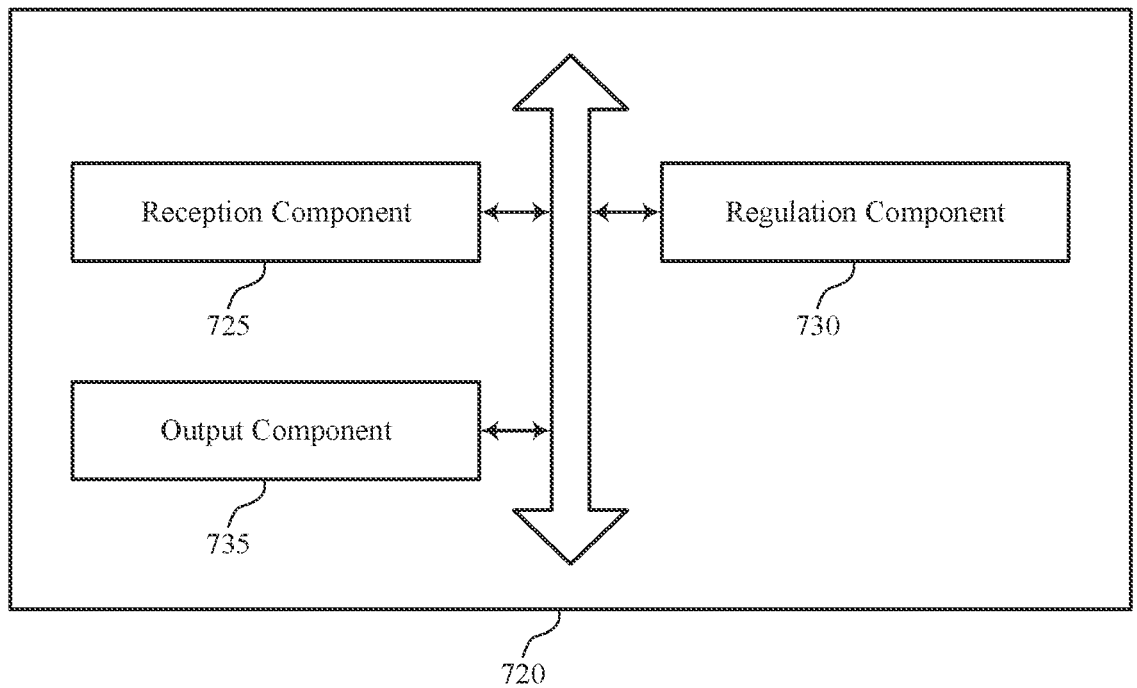
FIG. 7 shows a block diagram of a memory system power source that supports power stabilization for memory systems in accordance with examples as disclosed herein.

FIG. 7 shows a block diagram 700 of a memory system power source 720 that supports power stabilization for memory systems in accordance with examples as disclosed herein. The memory system power source 720 may be an example of aspects of a memory system power source as described with reference to FIGS. 1 through 5. The memory system power source 720, or various components thereof, may be an example of means for performing various aspects of power stabilization for memory systems as described herein. For example, the memory system power source 720 may include a reception component 725, a regulation component 730, an output component 735, or any combination thereof. Each of these components may communicate, directly or indirectly, with one another (e.g., via one or more buses).

The reception component 725 may be configured as or otherwise support a means for receiving, at a power source for a memory system, an indication associated with a power consumption for one or more operations to be performed by the memory system. The regulation component 730 may be configured as or otherwise support a means for adjusting a regulation of the power source based at least in part on the received indication. The output component 735 may be configured as or otherwise support a means for providing power for the memory system to perform the one or more operations based at least in part on the adjusted regulation of the power source.

In some examples, to support adjusting the regulation of the power source, the regulation component 730 may be configured as or otherwise support a means for adjusting a regulation of an output voltage of the power source.

In some examples, to support adjusting the regulation of the power source, the regulation component 730 may be configured as or otherwise support a means for changing one or more controller gains of the power source.

In some examples, to support adjusting the regulation of the power source, the regulation component 730 may be configured as or otherwise support a means for enabling or disabling power regulation circuitry of the power source.

In some examples, to support adjusting the regulation of the power source, the regulation component 730 may be configured as or otherwise support a means for changing a rate of power regulation by the power source.

In some examples, to support receiving the indication, the reception component 725 may be configured as or otherwise support a means for receiving an indication associated with a current to be provided by the power source for the one or more operations.

Figure 8:
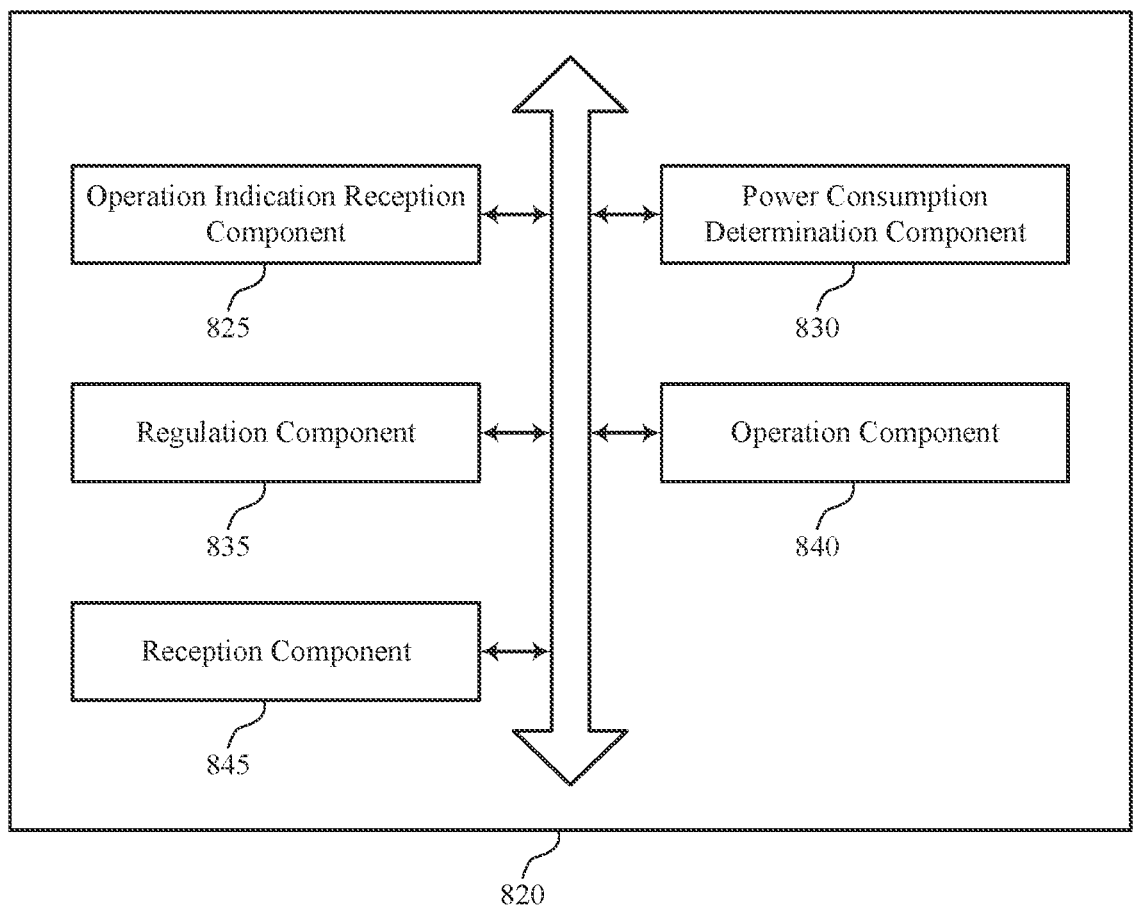
FIG. 8 shows a block diagram of a system that supports power stabilization for memory systems in accordance with examples as disclosed herein.

FIG. 8 shows a block diagram 800 of a system 820 that supports power stabilization for memory systems in accordance with examples as disclosed herein. The system 820 may be an example of aspects of a system as described with reference to FIGS. 1 through 5. The system 820, or various components thereof, may be an example of means for performing various aspects of power stabilization for memory systems as described herein. For example, the system 820 may include an operation indication reception component 825, a power consumption determination component 830, a regulation component 835, an operation component 840, a reception component 845, or any combination thereof. Each of these components may communicate, directly or indirectly, with one another (e.g., via one or more buses).

The operation indication reception component 825 may be configured as or otherwise support a means for receiving an indication of one or more operations to be performed by a memory system. The power consumption determination component 830 may be configured as or otherwise support a means for determining a power consumption associated with the one or more operations to be performed by a memory system. The regulation component 835 may be configured as or otherwise support a means for adjusting a regulation of a power source for the memory system based at least in part on the determined power consumption associated with the one or more operations to be performed by the memory system. The operation component 840 may be configured as or otherwise support a means for performing the one or more operations based at least in part on the adjusted regulation of the power source.

In some examples, to support receiving the indication of the one or more operations to be performed by the memory system, the reception component 845 may be configured as or otherwise support a means for receiving, from a host system, one or more indications of at least a subset of the one or more operations to be performed by the memory system.

In some examples, to support receiving the indication of the one or more operations to be performed by the memory system, the reception component 845 may be configured as or otherwise support a means for receiving an indication of one or more operations determined to be performed by the memory system without an associated indication from a host system.

In some examples, the regulation component 835 may be configured as or otherwise support a means for adjusting the regulation of the power source based at least in part on comparing the determined power consumption to one or more power consumption thresholds.

In some examples, the regulation component 835 may be configured as or otherwise support a means for adjusting the regulation of the power source based at least in part on determining that the power consumption satisfies a threshold change of power consumption.

In some examples, adjusting the regulation of the power source includes changing one or more controller gains of the power source, enabling or disabling power regulation circuitry of the power source, or changing a rate of power regulation by the power source, or any combination thereof.

Figure 9:
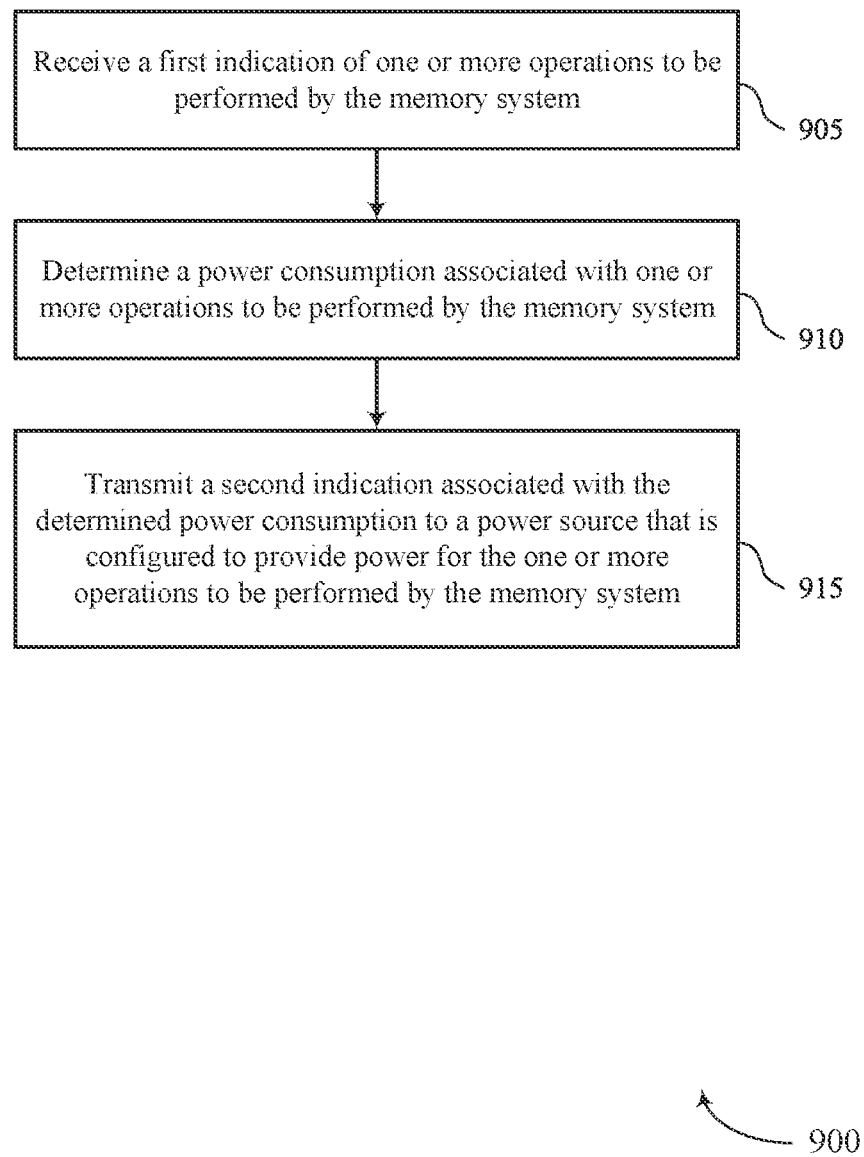
FIGS. 9 through 11 show flowcharts illustrating methods that support power stabilization for memory systems in accordance with examples as disclosed herein.

FIG. 9 shows a flowchart illustrating a method 900 that supports power stabilization for memory systems in accordance with examples as disclosed herein. The operations of method 900 may be implemented by a memory system controller or its components as described herein. For example, the operations of method 900 may be performed by a memory system controller as described with reference to FIGS. 1 through 6. In some examples, a memory system controller may execute a set of instructions to control the functional elements of the device to perform the described functions. Additionally. or alternatively, the memory system controller may perform aspects of the described functions using special-purpose hardware.

At 905, the method may include receiving (e.g., at a controller of a memory system) a first indication of one or more operations to be performed by the memory system. The operations of 905 may be performed in accordance with examples as disclosed herein. In some examples, aspects of the operations of 905 may be performed by a reception component 625 as described with reference to FIG. 6.

At 910, the method may include determining (e.g., by the controller of a memory system) a power consumption associated with one or more operations to be performed by the memory system. The operations of 910 may be performed in accordance with examples as disclosed herein. In some examples, aspects of the operations of 910 may be performed by a power consumption determination component 630 as described with reference to FIG. 6.

At 915, the method may include transmitting (e.g., by the controller of the memory system) a second indication associated with the determined power consumption to a power source that is configured to provide power for the one or more operations to be performed by the memory system. The operations of 915 may be performed in accordance with examples as disclosed herein. In some examples, aspects of the operations of 915 may be performed by a transmission component 635 as described with reference to FIG. 6.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a controller of a memory system, a first indication of one or more operations to be performed by the memory system; determining, by the controller of a memory system, a power consumption associated with one or more operations to be performed by the memory system; and transmitting, by the controller of the memory system, a second indication associated with the determined power consumption to a power source that is configured to provide power for the one or more operations to be performed by the memory system.

Aspect 2: The method, apparatus, or non-transitory computer-readable medium of aspect 1, where receiving the first indication of the one or more operations to be performed by the memory system includes operations, features, circuitry, logic, means, or instructions, or any combination thereof for receiving, from a host system coupled with the controller of the memory system, one or more indications of at least a subset of the one or more operations to be performed by the memory system.

Aspect 3: The method, apparatus, or non-transitory computer-readable medium of any of aspects 1 through 2, where receiving the first indication of the one or more operations to be performed by the memory system includes operations, features, circuitry, logic, means, or instructions, or any combination thereof for receiving an indication of one or more operations determined to be performed by the memory system without an associated indication from a host system coupled with the controller of the memory system.

Aspect 4: The method, apparatus, or non-transitory computer-readable medium of any of aspects 1 through 3, further including operations, features, circuitry, logic, means, or instructions, or any combination thereof for determining the second indication based at least in part on comparing the determined power consumption to one or more power consumption thresholds.

Aspect 5: The method, apparatus, or non-transitory computer-readable medium of any of aspects 1 through 4, further including operations, features, circuitry, logic, means, or instructions, or any combination thereof for determining that the power consumption satisfies a threshold change of power consumption and transmitting the second indication based at least in part on determining that the power consumption satisfies the threshold change of power consumption.

Aspect 6: The method, apparatus, or non-transitory computer-readable medium of any of aspects 1 through 5, further including operations, features, circuitry, logic, means, or instructions, or any combination thereof for transmitting, by the controller of the memory system, one or more third indications to one or more memory dies coupled with the power source to perform at least a subset of the one or more operations.

Aspect 7. The method, apparatus, or non-transitory computer-readable medium of any of aspects 1 through 6, further including operations, features, circuitry, logic, means, or instructions, or any combination thereof for performing, by the controller of the memory system, at least a subset of the one or more operations after transmitting the second indication.

Aspect 8: The method, apparatus, or non-transitory computer-readable medium of any of aspects 1 through 7, further including operations, features, circuitry, logic, means, or instructions, or any combination thereof for identifying a quantity of operations, of the one or more operations to be performed by the memory system, associated with an operation type and determining the power consumption based at least in part on the identified quantity of operations associated with the operation type and a power consumption associated with the operation type.

Aspect 9: The method, apparatus, or non-transitory computer-readable medium of any of aspects 1 through 8, where determining the power consumption includes operations, features, circuitry, logic, means, or instructions, or any combination thereof for determining a current associated with performing the one or more operations in accordance with an output voltage that is regulated by the power source.

Figure 10:
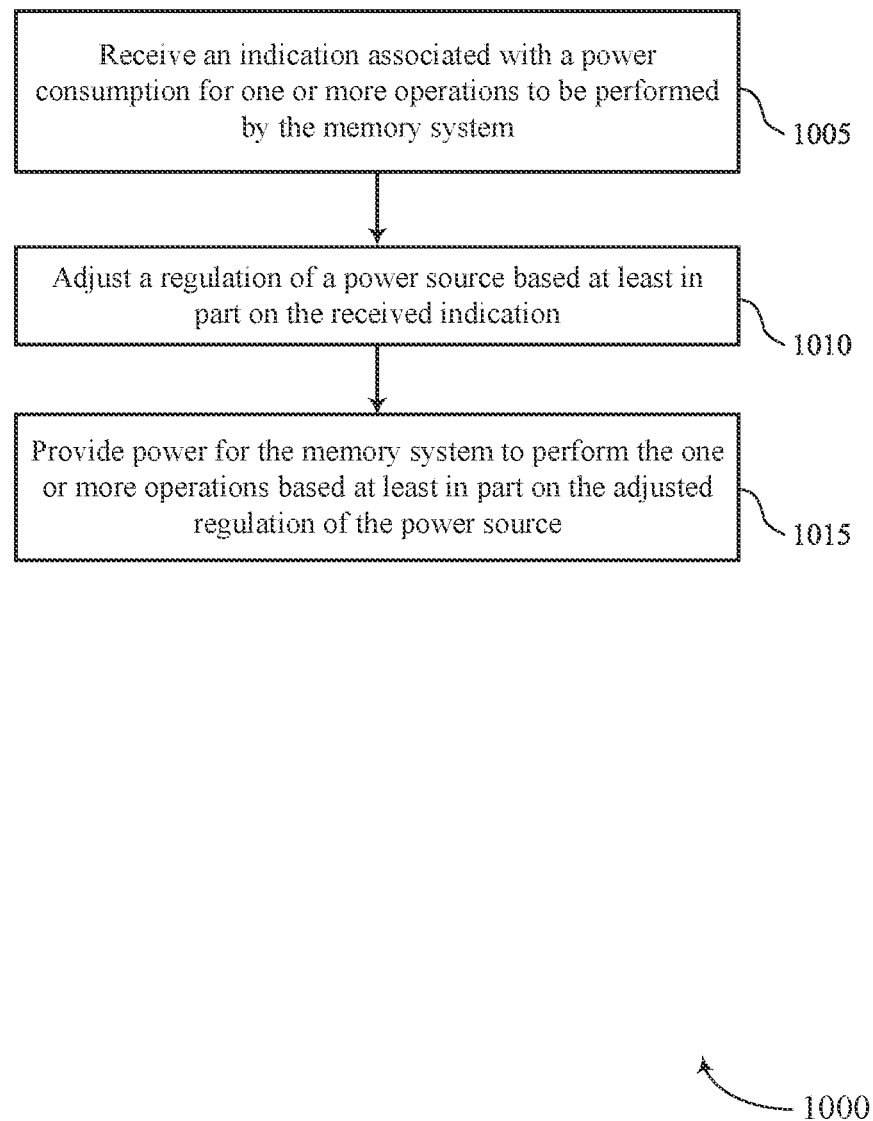

FIG. 10 shows a flowchart illustrating a method 1000 that supports power stabilization for memory systems in accordance with examples as disclosed herein. The operations of method 1000 may be implemented by a memory system power source or its components as described herein. For example, the operations of method 1000 may be performed by a memory system power source as described with reference to FIGS. 1 through 5 and 7. In some examples, a memory system power source may execute a set of instructions to control the functional elements of the device to perform the described functions. Additionally, or alternatively, the memory system power source may perform aspects of the described functions using special-purpose hardware.

At 1005, the method may include receiving (e.g., at a power source for a memory system) an indication associated with a power consumption for one or more operations to be performed by the memory system. The operations of 1005 may be performed in accordance with examples as disclosed herein. In some examples, aspects of the operations of 1005 may be performed by a reception component 725 as described with reference to FIG. 7.

At 1010, the method may include adjusting a regulation of the power source based at least in part on the received indication. The operations of 1010 may be performed in accordance with examples as disclosed herein. In some examples, aspects of the operations of 1010 may be performed by a regulation component 730 as described with reference to FIG. 7.

At 1015, the method may include providing power for the memory system to perform the one or more operations based at least in part on the adjusted regulation of the power source. The operations of 1015 may be performed in accordance with examples as disclosed herein. In some examples, aspects of the operations of 1015 may be performed by an output component 735 as described with reference to FIG. 7.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 10: A method, apparatus, or non-transitory computer-readable medium including operations, features, circuitry, logic, means, or instructions, or any combination thereof for receiving, at a power source for a memory system, an indication associated with a power consumption for one or more operations to be performed by the memory system; adjusting a regulation of the power source based at least in part on the received indication; and providing power for the memory system to perform the one or more operations based at least in part on the adjusted regulation of the power source.

Aspect 11: The method, apparatus, or non-transitory computer-readable medium of aspect 10, where adjusting the regulation of the power source includes operations, features, circuitry, logic, means, or instructions, or any combination thereof for adjusting a regulation of an output voltage of the power source.

Aspect 12: The method, apparatus, or non-transitory computer-readable medium of any of aspects 10 through 11, where adjusting the regulation of the power source includes operations, features, circuitry, logic, means, or instructions, or any combination thereof for changing one or more controller gains of the power source.

Aspect 13: The method, apparatus, or non-transitory computer-readable medium of any of aspects 10 through 12, where adjusting the regulation of the power source includes operations, features, circuitry, logic, means, or instructions, or any combination thereof for enabling or disabling power regulation circuitry of the power source.

Aspect 14: The method, apparatus, or non-transitory computer-readable medium of any of aspects 10 through 13, where adjusting the regulation of the power source includes operations, features, circuitry, logic, means, or instructions, or any combination thereof for changing a rate of power regulation by the power source.

Aspect 15: The method, apparatus, or non-transitory computer-readable medium of any of aspects 10 through 14, where receiving the indication includes operations, features, circuitry, logic, means, or instructions, or any combination thereof for receiving an indication associated with a current to be provided by the power source for the one or more operations.

Figure 11:
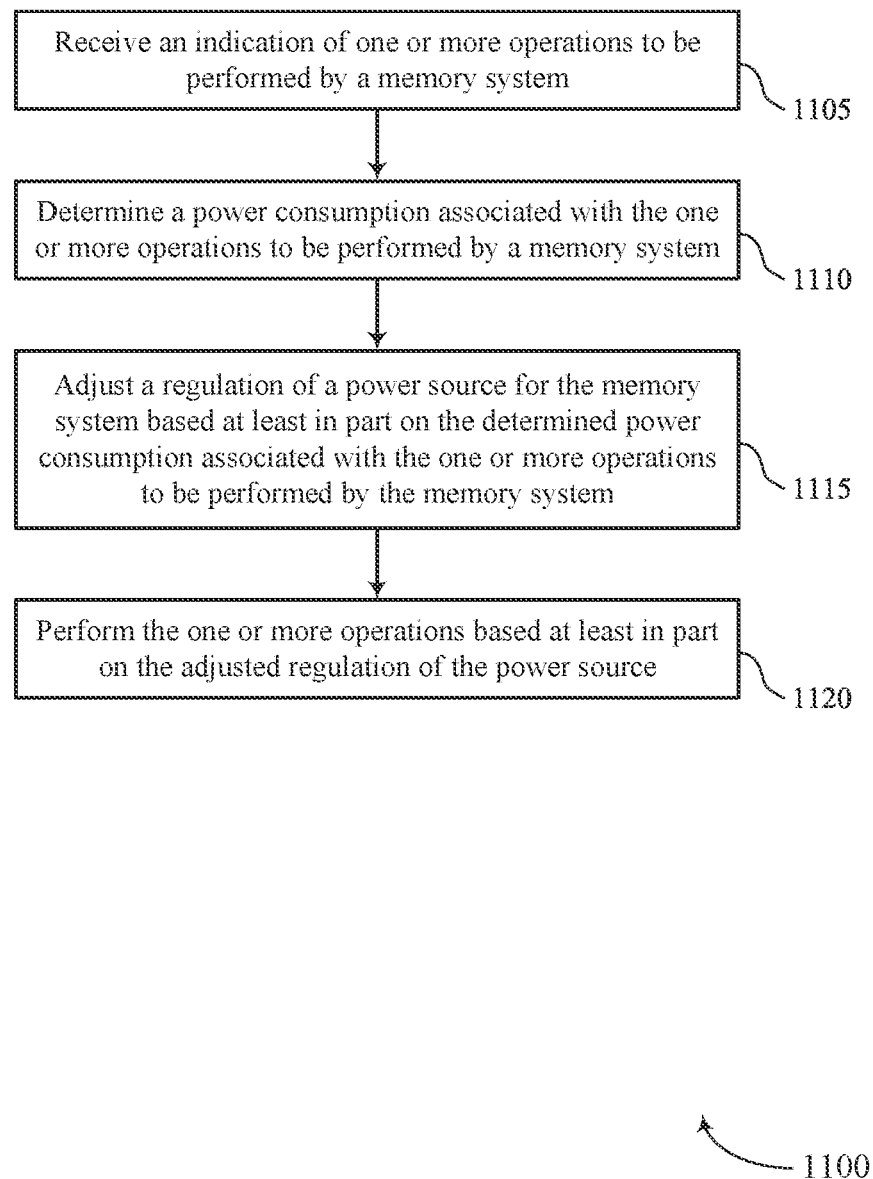

FIG. 11 shows a flowchart illustrating a method 1100 that supports power stabilization for memory systems in accordance with examples as disclosed herein. The operations of method 1100 may be implemented by a system or its components as described herein. For example, the operations of method 1100 may be performed by a system as described with reference to FIGS. 1 through 5 and 8. In some examples, a system may execute a set of instructions to control the functional elements of the device to perform the described functions. Additionally, or alternatively, the system may perform aspects of the described functions using special-purpose hardware.

At 1105, the method may include receiving an indication of one or more operations to be performed by a memory system. The operations of 1105 may be performed in accordance with examples as disclosed herein. In some examples, aspects of the operations of 1105 may be performed by an operation indication reception component 825 as described with reference to FIG. 8.

At 1110, the method may include determining a power consumption associated with the one or more operations to be performed by a memory system. The operations of 1110 may be performed in accordance with examples as disclosed herein. In some examples, aspects of the operations of 1110 may be performed by a power consumption determination component 830 as described with reference to FIG. 8.

At 1115, the method may include adjusting a regulation of a power source for the memory system based at least in part on the determined power consumption associated with the one or more operations to be performed by the memory system. The operations of 1115 may be performed in accordance with examples as disclosed herein. In some examples, aspects of the operations of 1115 may be performed by a regulation component 835 as described with reference to FIG. 8.

At 1120, the method may include performing the one or more operations based at least in part on the adjusted regulation of the power source. The operations of 1120 may be performed in accordance with examples as disclosed herein. In some examples, aspects of the operations of 1120 may be performed by an operation component 840 as described with reference to FIG. 8.

In some examples, an apparatus as described herein may perform a method or methods, such as the method 1100. The apparatus may include features, circuitry, logic, means, or instructions (e.g., a non-transitory computer-readable medium storing instructions executable by a processor), or any combination thereof for performing the following aspects of the present disclosure:

Aspect 16: A method, apparatus, or non-transitory computer-readable medium including operations, features, circuitry, logic, means, or instructions, or any combination thereof for receiving an indication of one or more operations to be performed by a memory system; determining a power consumption associated with the one or more operations to be performed by a memory system; adjusting a regulation of a power source for the memory system based at least in part on the determined power consumption associated with the one or more operations to be performed by the memory system; and performing the one or more operations based at least in part on the adjusted regulation of the power source.

Aspect 17: The method, apparatus, or non-transitory computer-readable medium of aspect 16, where receiving the indication of the one or more operations to be performed by the memory system includes operations, features, circuitry, logic, means, or instructions, or any combination thereof for receiving, from a host system, one or more indications of at least a subset of the one or more operations to be performed by the memory system.

Aspect 18: The method, apparatus, or non-transitory computer-readable medium of any of aspects 16 through 17, where receiving the indication of the one or more operations to be performed by the memory system includes operations, features, circuitry, logic, means, or instructions, or any combination thereof for receiving an indication of one or more operations determined to be performed by the memory system without an associated indication from a host system.

Aspect 19: The method, apparatus, or non-transitory computer-readable medium of any of aspects 16 through 18, further including operations, features, circuitry, logic, means, or instructions, or any combination thereof for adjusting the regulation of the power source based at least in part on comparing the determined power consumption to one or more power consumption thresholds.

Aspect 20: The method, apparatus, or non-transitory computer-readable medium of any of aspects 16 through 19, further including operations, features, circuitry, logic, means, or instructions, or any combination thereof for adjusting the regulation of the power source based at least in part on determining that the power consumption satisfies a threshold change of power consumption.

Aspect 21: The method, apparatus, or non-transitory computer-readable medium of any of aspects 16 through 20, where adjusting the regulation of the power source includes changing one or more controller gains of the power source, enabling or disabling power regulation circuitry of the power source, or changing a rate of power regulation by the power source, or any combination thereof.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 22: An apparatus, including: a controller of a memory system, the controller configured to: receive a first indication of one or more operations to be performed by the memory system; determine a power consumption associated with one or more operations to be performed by the memory system; and transmit a second indication associated with the determined power consumption to a power source that is configured to provide power for the one or more operations to be performed by the memory system.

Aspect 23: The apparatus of aspect 22, where, to receive the first indication of the one or more operations to be performed by the memory system, the controller is configured to: receive, from a host system coupled with the controller of the memory system, one or more indications of at least a subset of the one or more operations to be performed by the memory system.

Aspect 24: The apparatus of any of aspects 22 through 23, where, to receive the first indication of the one or more operations to be performed by the memory system, the controller is configured to: receive an indication of one or more operations determined to be performed by the memory system without an associated indication from a host system coupled with the controller of the memory system.

Aspect 25: The apparatus of any of aspects 22 through 24, where the controller is further configured to: determine the second indication based at least in part on comparing the determined power consumption to one or more power consumption thresholds.

Aspect 26: The apparatus of any of aspects 22 through 25, where the controller is further configured to: determine that the power consumption satisfies a threshold change of power consumption; and transmit the second indication based at least in part on determining that the power consumption satisfies the threshold change of power consumption.

Aspect 27: The apparatus of any of aspects 22 through 26, where the controller is further configured to: transmit one or more third indications to one or more memory dies coupled with the power source to perform at least a subset of the one or more operations.

An apparatus is described. The following provides an overview of aspects of the apparatus as described herein:

Aspect 28: An apparatus, including: a power source for a memory system, the power source configured to: receive an indication associated with a power consumption for one or more operations to be performed by the memory system; adjust a regulation of the power source based at least in part on the received indication; and provide power for the memory system to perform the one or more operations based at least in part on the adjusted regulation of the power source.

Aspect 29: The apparatus of aspect 28, where to adjust the regulation of the power source, the power source is configured to adjust a regulation of an output voltage of the power source.

Aspect 30: The apparatus of any of aspects 28 through 29, where to adjust the regulation of the power source, the power source is configured to change one or more controller gains of the power source, enable or disable power regulation circuitry of the power source, or change a rate of power regulation by the power source, or any combination thereof.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A. B. or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, at a controller of a memory system, one or more first indications of one or more operations to be performed by one or more memory dies of the memory system in accordance with a regulated voltage;
   determining, by the controller of the memory system, a power consumption associated with the one or more operations to be performed by the one or more memory dies of the memory system in accordance with the regulated voltage;
transmitting, from the controller of the memory system to a power source, separate from the one or more memory dies, that is configured to provide power to the one or more memory dies in accordance with the regulated voltage, a second indication associated with the determined power consumption associated with the one or more operations to be performed by the one or more memory dies; and
transmitting, by the controller of the memory system, one or more third indications to the one or more memory dies to perform the one or more operations after transmitting the second indication associated with the determined power consumption.

2. The method of claim 1, wherein receiving the one or more first indications of the one or more operations to be performed by the one or more memory dies comprises:
receiving, from a host system coupled with the controller of the memory system, one or more commands to access the one or more memory dies.

3. The method of claim 1, wherein receiving the one or more first indications of the one or more operations to be performed by the one or more memory dies comprises:
receiving an indication of at least one operation determined to be performed by the one or more memory dies without an associated indication from a host system coupled with the controller of the memory system.

4. The method of claim 1, further comprising:
determining the second indication based at least in part on comparing the determined power consumption to one or more power consumption thresholds.

5. The method of claim 1, further comprising:
determining that the power consumption satisfies a threshold change of power consumption in accordance with the regulated voltage; and
transmitting the second indication based at least in part on determining that the power consumption satisfies the threshold change of power consumption.

6. The method of claim 1, further comprising:
identifying a quantity of operations, of the one or more operations to be performed by the one or more memory dies, associated with an operation type; and
determining the power consumption based at least in part on the identified quantity of operations associated with the operation type and a power consumption associated with the operation type.

7. The method of claim 1, wherein transmitting the second indication comprises:
transmitting an indication of a range of power consumption, the indication selected, at the controller of the memory system based at least in part on the determined power consumption, from a plurality of indications each associated with a respective range of power consumption of a plurality of ranges of power consumption.

8. A method, comprising:
providing, by a power source of a memory system separate from one or more memory dies of the memory system, first power in accordance with a voltage level for the one or more memory dies to perform one or more first operations, wherein the first power is provided based at least in part on a first regulation of the voltage level at the power source;
receiving, at the power source, an indication associated with a power consumption for one or more second operations to be performed by the one or more memory dies of the memory system in accordance with the voltage level;
adjusting, based at least in part on the received indication and before the one or more second operations are performed, from the first regulation of the voltage level at the power source to a second regulation of the voltage level at the power source; and
providing, by the power source, second power in accordance with the voltage level for the one or more memory dies to perform the one or more second operations, wherein the second power is provided based at least in part on the second regulation of the voltage level at the power source.

9. The method of claim 8, wherein adjusting from the first regulation of the voltage level at the power source to a second regulation of the voltage level at the power source comprises:
changing one or more controller gains of the power source based at least in part on the received indication associated with the power consumption for the one or more second operations.

10. The method of claim 8, wherein from the first regulation of the voltage level at the power source to a second regulation of the voltage level at the power source comprises:
enabling or disabling power regulation circuitry of the power source based at least in part on the received indication associated with the power consumption for the one or more second operations.

11. The method of claim 8, wherein from the first regulation of the voltage level at the power source to a second regulation of the voltage level at the power source comprises:
changing a rate of power regulation by the power source based at least in part on the received indication associated with the power consumption for the one or more second operations.

12. The method of claim 8, wherein receiving the indication comprises:
receiving an indication of a current or a range of current to be provided by the power source for the one or more second operations.

13. An apparatus, comprising:
a controller of a memory system, the controller configured to:
receive one or more first indications of one or more operations to be performed by one or more memory dies of the memory system in accordance with a regulated voltage;
determine a power consumption associated with the one or more operations to be performed by the one or more memory dies of the memory system in accordance with the regulated voltage;
transmit, to a power source, separate from the one or more memory dies, that is configured to provide power to the one or more memory dies in accordance with the regulated voltage, a second indication associated with the determined power consumption associated with the one or more operations to be performed by the one or more memory dies; and
transmit one or more third indications to the one or more memory dies to perform the one or more operations after transmitting the second indication associated with the determined power consumption.

14. The apparatus of claim 13, wherein, to receive the one or more first indications of the one or more operations to be performed by the one or more memory dies, the controller is configured to:

receive, from a host system coupled with the controller of the memory system, one or more commands to access the one or more memory dies.

15. The apparatus of claim 13, wherein, to receive the one or more first indications of the one or more operations to be performed by the one or more memory dies, the controller is configured to:

receive an indication of at least one operation determined to be performed by the one or more memory dies without an associated indication from a host system coupled with the controller of the memory system.

16. The apparatus of claim 13, wherein the controller is further configured to:

determine the second indication based at least in part on comparing the determined power consumption to one or more power consumption thresholds.

17. The apparatus of claim 13, wherein the controller is further configured to:

determine that the power consumption satisfies a threshold change of power consumption in accordance with the regulated voltage; and transmit the second indication based at least in part on determining that the power consumption satisfies the threshold change of power consumption.

18. The apparatus of claim 13, wherein, to transmit the second indication, the controller is configured to:

transmit an indication of a range of power consumption, the indication selected, at the controller of the memory system based at least in part on the determined power consumption, from a plurality of indications each associated with a respective range of power consumption of a plurality of ranges of power consumption.

* * * * *